United States Patent [19]

Becker

[11] 4,071,992
[45] Feb. 7, 1978

[54] CONSTRUCTION UNIT

[76] Inventor: Otto Alfred Becker, Robert Koch-Str. 59, D 6600 Saarbrucken, Germany

[21] Appl. No.: 701,180

[22] Filed: June 30, 1976

[30] Foreign Application Priority Data

| July 1, 1975 | Germany | 2529173 |
| Nov. 24, 1975 | Germany | 2552586 |
| Dec. 31, 1975 | Germany | 2559342 |

[51] Int. Cl.² .............................................. E04C 2/36
[52] U.S. Cl. ..................................... 52/223 R; 52/406; 52/618; 52/619
[58] Field of Search ............... 29/452; 52/223 R, 618, 52/619, 406; 428/69

[56] References Cited

U.S. PATENT DOCUMENTS

| 2,914,147 | 11/1959 | Millard | 52/222 |
| 3,201,076 | 8/1965 | Deleuze | 52/727 X |
| 3,232,638 | 2/1966 | Hollander | 52/223 R |
| 3,567,816 | 3/1971 | Embree | 52/223 R |
| 3,803,784 | 4/1974 | Becker | 52/615 X |
| 3,834,096 | 9/1974 | Becker | 52/618 X |

FOREIGN PATENT DOCUMENTS

| 2,342,049 | 3/1975 | Germany | 52/223 R |
| 2,365,200 | 7/1975 | Germany | 52/615 |
| 712,519 | 7/1954 | United Kingdom | 52/223 R |

Primary Examiner—Alfred C. Perham
Attorney, Agent, or Firm—Donald D. Jeffery

[57] ABSTRACT

A loadbearing construction unit which is compression-resistant and bending-resistant and formed of at least one shell and associated support elements. The support elements comprise at least two plate or rodlike elements which are tensioned with respect to each other to obtain a compressive or tensile stress on the elements.

26 Claims, 4 Drawing Figures

CONSTRUCTION UNIT

The invention relates to a construction unit and in particular a compression-resistant, bending-resistant load bearing construction unit, for example for buildings, columns, bridges and vehicles, which is preferably provided with an insulation.

Construction units are already known which consist of two or more shells with at least one seal disposed between the shell edges and a cavity which is enclosed in air-tight manner thereby and in which are arranged pressure means (for example honeycomb plates) with interposed fixed plates (for example metal plates) and associated sealing plates (for example plastics foam plates) which are coated with vapour-proof foils (for example aluminum foils), at least one of the shells being disposed moveably with variable position or flexibly (for example concavely) and a vacuum or reduced pressure obtaining in the cavity. Due to this reduced pressure the shells are firmly pressed onto the support core formed by the aforementioned parts so that a very high strength and bending resistance of the entire construction unit results. Such construction units have been described in detail in earlier patent specifications and patent applications of the same Applicant. As apparent from these earlier patent specification, the support core and the possibly additionally provided outer shells may have a great number of different forms depending on the particular purpose and consequently for simplification reference is made to these elder patents specifications and patent applications.

The present invention is based on the problem of providing a construction unit of the type mentioned at the beginning which has a still higher strength, in particular bending strength and compressive strength, so that the load bearing capacity of said construction units is increased.

According to the invention this problem is solved in that the construction unit comprises an arrangement of prestressed support elements which extend in each case in the plane of the construction unit.

These support elements may be provided in the interior of the support core or alternatively outside the shells and mounted on the latter.

The support elements may advantageously be made in hollow form, for example in the form of individual rectangular tubes which may be arranged closely in succession in groups both adjacent each other and in series and are preferably joined together by adhesive layers. Said support elements may be arranged in predetermined intervals with respect to each other, thus producing free intermediate spaces through which inter alia crossconnecting screws can engage from shell to shell. For mutual supporting of the support elements in said free spaces horizontally or diagonally disposed cross supports may be provided.

According to a further advantageous development of the invention the supports are disposed between the inner shells and plates which bear in area contact on the support elements and are for example adhered thereto, thus forming between said inner shells closed cavities within the larger cavity providing means for supporting the inner shells, for example honeycomb plates. Said honeycomb plates are pressed by the shells of the greater cavity against said inner shells between which the support elements are introduced and thereby prevent in accordance with their pressure force a bulging or buckling of the support elements. Instead of honeycomb plates other perpendicular support means arranged vertically on the inner shell surfaces may be introduced.

According to a further advantageous development of the invention the preferably rectangularly formed support elements are constructed in the interior as hollow cylinders which are preferably provided at both ends with oppositely cut hollow cylinder threads. Spindles are introduced into said hollow cylinders from both sides and their total length is greater than that of the hollow cylinders. These spindles carry at their outer ends screw threads which as counter thread can be screwed into the hollow cylinder threads. For this purpose the diameter of the spindle threads is correspondingly greater than the diameter of the spindles (screw core) themselves. Between the smooth spindle lengths and the hollow cylinder there is no play after completing the compressive and tensile stress. If spindles are screwed in they abut against each other corresponding to their dimensions with their ends in the hollow cylinder of the rectangular tube. If the rotation of the one or of both spindles is continued the rectangular tubes are stretched and tensioned. Such stresses may be effected up to the limit of the elasticity of the threads in the rectangular tubes in the longitudinal direction. The spindle portions projecting on both sides from the hollow cylinders are cut off and then possibly drilled out to such an extent that a pressure exerted on the rectangular tube does not act directly on the spindle. Thus, the rectangular tube resists an outer pressure on its ends not only with a resistance corresponding to its elasticity modulus but also with an additional resistance corresponding to the longitudinal stress imparted thereto. Because of this stress the tubes have an increased load-bearing capacity and bending resistance. Such tubes may also be arranged in the horizontal direction, preferably on three supports of identical type, and offer a resistance higher corresponding to their bending in the transverse direction. Horizontally laid tubes may carry at their end flanges which engage in perpendicular tubes and thus form with the latter U-shaped or rectangularly closed loadbearing construction units. Corresponding to the form of the perpendicular tubes the flanges may be made larger and thus enclose said tubes from the outside. Any desired number of vertically extending screws may be disposed at any desired intervals and associated with the horizontal tubes, thus ensuring the spacing between every two perpendicular supports.

Such screws may also be spindles with for example threads oppositely cut at their ends and associated moveable nuts by which on rotation of the spindles the spacing of the latter with respect to each other is increased and thus corresponding pressures are exerted on the constructional elements associated with the nuts.

Instead of two spindles, for stressing the tubes only one spindle can be provided when the other end of the tube has a closure of sufficient strength to withstand the full pressure of the free end of the spindle acting against said closure.

Such support constructions may also be connected to the construction units in the respective necessary direction outside said units or also be used freely without the latter. For stretching and tensioning such supports their spindles may also be provided outside the supports when the support heads are so constructed that they can take up laterally of the supports the pressure spindles, for example arranged in opposite pairs. The possible uses are thus practically unlimited.

The invention will be described hereinafter in detail with reference to some examples of embodiment illustrated in the drawings wherein.

Figure 1:
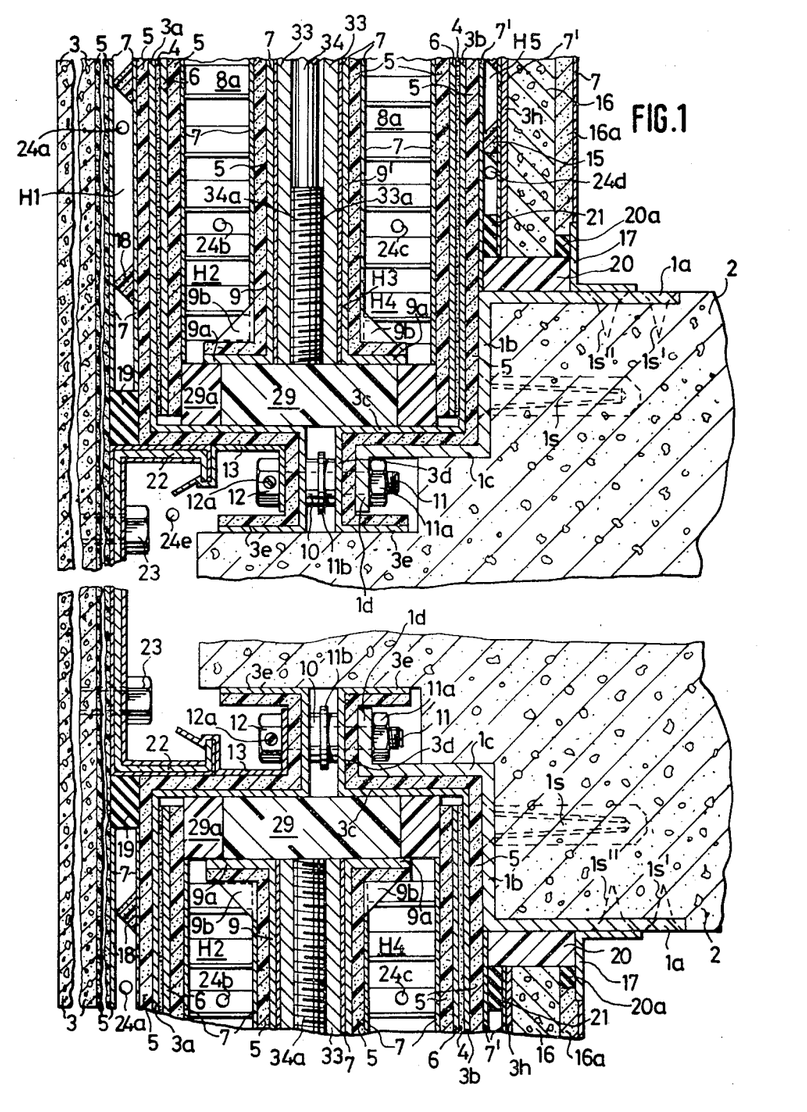
FIG. 1 is a sectional view through an embodiment of the construction unit.

FIG. 1 shows schematically in vertical section parts of two construction units arranged beneath each other. Each construction unit is mounted with a frame 1 with frame portions 1a, 1b, 1c, 1d on the stepped end edge of a building floor 2. For this purpose securing elements (not shown) are provided laterally of the construction units and fixedly connected thereto in loadbearing manner; said securing elements are mounted with horizontal screws 1s on the end edge and further screws 1s' and 1s'' are provided which run perpendicularly through the frame portions 1a and engage in the floor 2.

The frame portions 1a, 1b, 1c, 1d carry the front part of the construction unit with the shells 3a, 3b which are disposed in front of the end edge of the building floor 2. The frame 1 encloses the edge portions of the shells 3b in loadbearing and air-tight manner. The shells 3a and 3b consist preferably of one or more metal plates angled all round in vapourtight manner, for example of steel or aluminium or of an angled plastic plate. On one or both sides of the sheet metal plates 3b further sheet metal plates 6 may be provided as planar panel or as profile panel for example trapezoidal, said parts preferably being made resiliently firm in composite construction. The parts may be provided at the edge portions with flanges, for example in the same manner as the shells 3a, 3b or in another form and direction, in particular for jointly or separately taking up connecting means or the like for connecting together and possibly to other parts of the construction unit. the frame 1 is joined to the shell 3b for example by an adhesive layer of a resilient sounsdabsorbing plastic adhesive. In the embodiment illustrated in FIG. 1 the shell 3b is provided in laminate structure with insulating layers 4, 5. These insulating layers consist preferably of plastic, for example in the form of sheets 4 and/or in the form of plastic foam panels 5 or may be formed by an applied plastic composition. Alternatively, the intermediate layers may be adhered together in several plies successively in particular for increasing sound insulation. Towards an intermediate vapour-tight cavity H4 a further resilient layer is disposed, preferably a panel of plastic foam 5 with closed pores on which a reflecting foil, for example an aluminium foil 7, is applied.

With the aid of spacing means and insulating means and if necessary loadbearing supports an outer shell 3 is disposed in front of the shell 3a and is made for example of inorganic material, preferably cement, for example with plastics. Between the shell 3a and the outer shell 3 a cavity H1 is formed. The outer shell 3 is also multilayer for example by fixedly adhering 1 or more metal foils or plastic sheets as vapour-tight intermediate layer. For protecting the construction unit from damage, for example the penetration of ball elements, the outer shell may be armoured with a preferably adhered metal layer or with metal pieces, e.g. chips, or a plurality of for example finely perforated metal layers may be embedded whose perforation diameters are less than the ball diameter.

The inner surface of the outer shell 3 facing the cavity H1 in the example of embodiment illustrated is coated with a reflecting foil 7 and in addition between the outer shell 3 and the reflecting layer 7 a resilient layer of a different type may be adhered, for example a plastic foam panel 5 with closed pores. Arranged in the cavity H1 are preferable insulating and reflecting spacing means, for example triangular strips 18, whose pointed edges are directed towards the outer shell 3 and which are made in particular from insulating material, for example plastic hard foam, hard fibre boards, and are secured by adhesive. The pointed edge of the strips 18 penetrates into the soft layers 7 and 5 and thus encloses the chamber compartment, which is thereby sealed all round. This provides a considerable heat and sound insulation due to the extreme reduction to the minimum linear contact areas. This effect can be increased by adhering the triangular strips in multiple succession on both sides for example on plastic plates and/or plastic foam plates so that the following shell 3a is also contacted only by linear edges. Due to the reflecting surface coating of the strips 18 the chamber forms a mirror chamber all round.

Furthermore, aluminium foils may be tensioned resiliently in said chamber H1. Depending on the use of the overall construction unit the cavity may be evacuated to a varying extent via tubes 24 and valves or filled with a dry gas at for example excess pressure, thus exerting an increased pressure on the shell 3a. The cavity H1 is further sealed towards the outside by an encircling seal 19.

Furthermore, a honeycomb plate wit large cell diameters may be arranged in the cavity H1.

The material chosen for the individual layers depends on the particular use of the construction unit.

The remaining shells 3b, 9, 9', 16 and the associated cavities H2 to H5 may be made in the manner described for the shells 3a and 3.

To exert a higher application stress in particular with thicker material, screws may be provided at the preferably angled edge portions of the individual layers.

By tightening these screws the predetermined stressing of the intermediate material or support core may be effected. In the example of embodiment illustrated in FIG. 1 honeycomb plates are disposed in the cavities H2 and H4. For reflecting heat and sound all the walls of the cells and chambers and possibly their inserts are made highly reflecting all round and a filler material known per se may be introduced into the cells and chambers.

If fire proofing is necessary largely asbestos materials and possibly heat resistant metal plates may be used.

In particular, the shell 16 lying towards the inner space and preferably provided with a gypsum layer 16a may be formed with fire-proof intermediate layers depending on the fire proofing necessary. To reduce the irradiation of the thermal energy the shell 16 comprises at its inner surface towards the cavity H5 a highly reflecting metal sheet 3h with for example a nickel or chromium layer 7' and opposite said layer a further highly reflecting layer 7' is arranged which reflects back the major part of the irradiated energy. Furthermore, as described for the cavity H1 resiliently tensioned sheets may be provided and to reduce thermal conduction triangular strips 15 inserted. The interior shell or the cavity H5 formed between the interior shell and the shell 3b is sealed by an encircling resilient seal 20 so that the interior shell is freely oscillatable on all sides to give high sound absorption.

In a fire the resilient seals may be destroyed but the shell 16 is then still held by rails 17 which are provided at least at the bottom and the ceiling.

At the back of the outer shell 3 an encircling frame-like U-shaped holding means 22 for example of metal is screwed on with screws 23. Said holding means 22 is inserted into the intermediate spaces between the construction units adjacent all round and secured in any suitable manner, for example engaged in correspondingly associated securing members 13. The cavities between the adjacent construction units are thus also sealed in air-tight manner and may possibly be provided with a reduced pressure by which the outer shell 3 is pressed in the direction towards the shell 3a. For this purpose evacuating openings 24e lead into said cavities which may alternatively also be filled with dry gas via said openings.

To connect the shells together screws 11 with attachable screwheads 12 with securing nuts 12a and nuts 11a fixedly welded to the flanges 3d are used. Between the two flanges 3d there is a disc 11b which divides the seal 10 and which in the longitudinal direction of the screw 11 is fixed in position. If the screw 11 is set in rotation by the screwhead 12 the disc 11b is displaced accordingly. In this manner the flanges 3d may be moved apart to varying degrees as desired. If the spacings of the shells with respect to each other are increased the air in the individual chambers, cells or the like may be evacuated via an opening 24. If hereafter the shells are brought closer together by the screws 12 each individual cell 8a or chamber is sealed in air-tight manner. Corresponding tube and hose connections may be provided from an evacuating means to the openings 24. If the shells are flexible increasing the distance apart of the flanges 3d does not always suffice to effect total evacuation. For this purpose screws permitting the spacing of the shell surfaces with respect to each other to be altered may be arranged transversely of the shells (not illustrated).

If the shells are pressed against each other after the evacuation the aluminium foils with the plastic foam plates disposed behind them and the other layers are pressed in cushion-like manner convexly into the cells. A resilient tensioning of the metal foils takes place and these thus act as diaphragms. They have a predetermined tension which can be imparted thereto and thus their own natural frequency. This makes it possible to absorb in particular low-frequency oscillations of a broad spectrum. These foils and the plastic hard foam plates may be pretensioned from the start for example by springs. The individual layers may thus have predetermined different natural frequencies. Any infrared radiation which penetrates through the foam material panels or is diffusively scattered by the relection at the pores and reaches the opposite metal foil is reflected by the latter back into the foam material plate. The foam structure is set in oscillation and converts the infrared radiation to heat. If foils or metal sheets or plastic foam plates or the like are resiliently tensioned a gradation of their natural frequencies may be provided so that in gradual manner the frequencies of the preceding diaphragms are not absorbed or are only absorbed to a reduced extent by the following tensioned diaphragms and/or converted to heat. It is also pointed out that the change of the natural frequency of the shell 3b due to the edge reinforcement by the frame 1 greatly reduces the acoustic oscillations.

According to the invention support elements are disposed in the construction unit. Said support elements 33, 34 are arranged between the shells 3a, 3b preferably between honeycomb plates 8a. The support elements may be in particular rectangular tubes which are joined together for example by horizontally extending rectangular tubes arranged at their upper and lower ends to form a frame.

The horizontal connecting tubes may be inserted with tube flanges into the perpendicular tubes. Such frames may be amplified to form loadbearing support structures in that in the depth direction as well one or more further frames are rigidly connected to the first frame or to each other by for example horizontal rectangular tubes or the like. This provides space structures which can bear loads in all directions. The frames may be supported by the honeycomb plates against bulging or buckling by associated plates 9, 9' which bear thereon and are connected thereto for example by adhesion or screwing or the like. Furthermore, the respective cavities between the shells 3a, 3b enclosing the honeycomb plates 8a may preferably be evacuated so that the atmospheric pressure of the air acting on the outer shells acts on the inner shells covering the support elements and thus supports the latter in a manner resistant to bending. If in addition apart from the cavity containing the honeycombs or other support means further cavities are provided the latter may be provided with an excess pressure so that the pressure exerted by the honeycomb webs is still further increased.

The rectangular tubes may be constructed with cylindrical cavities which can receive spindles of substantially the same diameter. Cut into the cylindrical cavities (hollow cylinders), preferably at both ends, are oppositely running hollow cylinder threads 33a. Into the latter the spindles 34 provided at both ends with counter threads 34a are screwed. The length of the smooth spindle portions is so dimensioned that they are for example in contact in the centre of the hollow cylinder and by the further screwing-in of the spindles 34 the hollow cylinder 33 is stretched and stressed. For this purpose the outwardly projecting spindle portions 34a are provided with correspondingly sized spindle heads, in particular lever-like detachable heads, which permit the screwing together of the spindles up to the limit of the elasticity or compressive strength of the threads. This enables maximum pressures and stresses to be achieved by which the rectangular tubes or hollow cylinders are correspondingly stressed in compression-resistant and bending-resistant manner in the longitudinal direction. Via the inner plates or shells 9, 9' between which the rectangular tubes are arranged the pressure of the shells 3a, 3b may be transmitted via the honeycomb webs to the latter and thus providing additional securing against bulging or buckling from both sides. After establishing the intended degree of stressing the outwardly projecting spindle portions 34a are cut off and preferably somewhat deepened by milling with respect to the edges of the rectangular tubes so as to exert the pressure solely on the hollow cylinders 33. Such hollow cylinders 33 may be arranged tightly together or depending on the pressures to be taken up at certain intervals leaving corresponding cavities which they define jointly with the inner plates or shells 9, 9'.

The cavities between the inner shells 9, 9' are evacuated. The transverse screws for pressing the other shells against the interposed honeycomb plates or the like are arranged in such a manner that they pass through said free spaces in air-tight manner. The lateral spacing of the tubes with respect to each other may be fixed by screws or the like arranged therebetween so that lateral buckling of the hollow cylinders 33 is also impossible. With adequate width of the rectangular tubes the latter may also be provided with corresponding borings or millings with a plurality of hollow cylinders. Such support elements may be rigidly connected in the horizontal direction to further support elements and form for example ceiling elements. Thus, it is possible not only to use the construction elements as wall elements for perpendicularly dividing space but preferably also as load-bearing floor and ceiling elements. The necessary free space in the vertical support elements for inserting the tube flanges of the horizontal support elements does not prevent the provision of the tube spindles. The threads may be cut at a corresponding distance from the tube ends and towards the outside a smooth spindle portion corresponding to said portion of the hollow cylinder may be provided.

This projecting portion may be removed by milling. The screws possibly disposed between every two tubes in the transverse direction may also be spindles which have for example threads cut oppositely at their ends and associated moveably disposed nuts so that on rotation of the spindles the necessary pressures are exerted on the support elements bearing thereon.

Instead of two spindles in a hollow cylinder of a tube only one spindle of correspondingly greater length may be provided if the other end of the tube 33 is sealed so that it can take up the full pressure of the free end of the spindle acting thereagainst.

Such support structures may be provided in a multi-part construction unit in cavities formed especially therefor with the support means pressing vertically on the shells disposed therein in any desired adjacent or series array. The honeycomb supporting of the stress tubes in conjunction with pressure screws acting perpendicularly to the surfaces of the support can increase the bending resistance thereof to an almost unrestricted amount.

To obtain extremely high stress forces with the pressure spindles the pitch heights are made as low as possible but the spindle circumference as large as possible. To reduce friction the turns are made as smooth as possible and provided with lubricants to improve the sliding behaviour. After obtaining the predetermined stress state the clamping in the engaging threads is such that subsequent loosening cannot occur.

The magnitude of the resilient counter force obtained depends on the elasticity modulus. The reciprocal value is the elasticity coefficient. The elasticity limit must not be exceeded because otherwise the inner molecular structure undergoes a permanent change which destroys the stress. Beneath the elasticity limit the changing shape or length is proportional to the force applied.

To receive the support elements in the cavity provided for this purpose between the shells 3a, 3b there is disposed in the interior on the shell angled portions 3c in angular encircling arrangement a vapour-tight insulating bridge 29 which may have a plurality of layers. This insulating bridge has adequate strength to bridge the gap between the two opposed angled portions 3d of the shells 3a, 3b. To compensate for the changing spacing of the shells 3a, 3b on evacuation an elastomeric sealing band 29a is provided on both sides. The support elements are disposed substantially between the shells 3a and 3b. They take up in particular the perpendicular stresses. The cavity H3 is defined by the inner plates or shells 9 and 9'. Said plates 9 and 9' may be fixedly connected for example by adhering to the stress tubes provided as support elements, in particular rectangular tubes 33. To enable the pressure acting on the plates 9 and 9' to be better distributed the edge portions thereof are formed with encircling flanges 9a which are sealed air-tight all round with respect to the insulating bridges 29, 29a.

If the cavities H2 and H4 are evacuated the atmospheric pressure or an excess pressure in the chambers H1 and H5 exerts a predeterminable pressure via the honeycomb webs or chamber walls on the shells 9 and 9' which in turn exert a pressure on the adjacent walls of the rectangular tubes 33 and support the latter.

The construction unit may also be designed in such a manner that the plates 6 and the interposed support elements and the surrounding insulating bridges 29 and 29a form an independent self-contained preferably evacuated construction unit which is inserted into an outer construction unit for example with the shells 3a and 3b. The inner construction unit with its outer plates 6 may be adhered to the shells 3a and 3b. The cavities H1 and H5 may be treated separately and for example provided with an excess pressure of a dry gas. Many combinations are possible which depend on the intended purpose. The pressure which the support elements exert on the insulating bridge 29 is conducted via the angled flanges 3c, 3d and 3e to the building floor 2 and via the latter taken up by the construction unit disposed therebelow with the same flanges and via further construction units possibly disposed therebelow up to the foundation of the building. The flanges may be correspondingly reinforced for this purpose, for example by inserting correspondingly identically shaped angle profiles 9b, 9b' and additional support elements. The shell 3 suspended in front may in its vertical dimensions be independent of the height of the individual construction units as apparent from the drawings.

Figure 2:
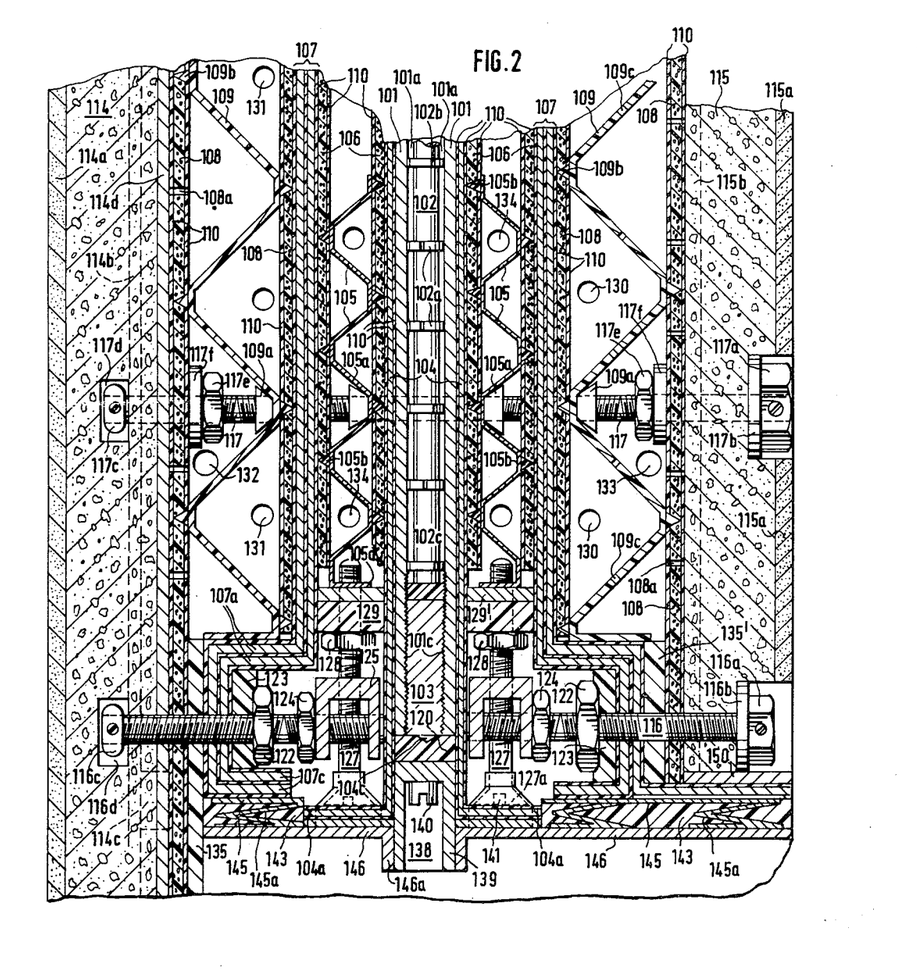
FIG. 2 is a section through a further embodiment of the construction unit.

FIG. 2 shows in vertical cross-section a further embodiment of the construction unit which comprises a centre support group which is formed by spaced adjacent support elements in the form of tubes 101, preferably rectangular tubes with cylindrical bores 101a and circular tubes inserted therein or circular rods 102 which have a diameter preferably smaller than the cylindrical bores 101a and carry at statically predetermined intervals rings 102a which are preferably provided with venting slots 102b and which prevent a bending out of the circular tubes or rods. Cut into the ends, at least into one end, of the bore 101a are internal threads 101c into which threaded pieces 103 are inserted after the circular tube or rod 102 with sealings 102c has been inserted. The length of the circular tube or circular rod 102 should be dimensioned so that by counter-screwing of the threaded pieces 103 circular tubes or rods may be subjected to very high pressure, thus producing a very high counter pressure which imparts a correspondingly high tensile stress to the outer tube 101. The tube 101 may for example be evacuated via a lateral bore via a tube with valves or this may be done in an evacuating chamber, for which purpose corresponding means to be actuated from the outside are provided in said evacuating chamber to the evacuating openings by which after performing the evacuation the latter are sealed, for example soldered up. The high prestressing can be effected with the aid of outwardly projecting correspondingly large heads of the threaded pieces 103 and by long cranks or levers (not illustrated) attachable to said heads up to the limit of the material strength.

Once a predetermined prestressing is achieved the tensioning head should be removed, for example cut off. If necessary, for example by milling, a portion of the threaded pieces screwed into the threaded 101c may be removed up to a predetermined depth or a bore with an inner thread milled into the threaded piece 103. This makes it possible inter alia in the outward direction to insert screws additionally for connecting the prestressed tubes 101 to other parts of the construction unit and for effecting additional tensionings. The tubes 101 are arranged between cover plates 104b provided on both sides, for example sound-insulated composite metal plates 104 at intervals to each other in a suitable number, for example by adhering to the composite cover plates and/or by welding. Said cover plates 104 may for example be sealed in air and vapourtight manner by surrounding seals 104c. This makes it possible to evacuate the cavities between the cover plates and the tubes 101 arranged adjacently in spaced relationship or to provide an excess pressure. To connect said cavities to each other grooves for example in a horizontal direction are cut into the surfaces of the tubes 101 bearing on the cover plates 104. Grooves connecting the cavities may also be provided in the seals (e.g. encircling) defining the cavities at the inner surfaces.

It is also possible to fill such cavities if necessary with plastic foams, for example polyurethane. The spaces between the tubes 101 may be dimensioned such that they permit the passage of transverse screws 117 which support the cover plates 104 from the inside and/or outside with nuts 105a or flanges as pressure and/or spacing means. As spacing means for distances of any desired magnitude tube sections may also be arranged parallel to the cover plate 104 in the spacing gaps between every two tubes 101. This prevents a bulging of the tubes in the lateral direction parallel to the cover surfaces.

Such tube groups disposed in air-tight manner between plates 104 can be arranged in series and it is advantageous to make the location of the tubes 101 and thus the location of the cavity gaps between two tubes offset with respect to the following tube groups. Said tube groups may be supported in bending-resistant manner by pressure means, nuts and flanges which are provided at the outer surfaces of the cover plates 104. Between the groups resilient layers of for example rubber or plastic (e.g. copolymer foils), adhered on both sides, may be provided.

The embodiment illustrated in FIG. 2 of the construction unit comprises on both sides of the plates 104 trapezoidal metal sheets 105 between insulating plates 106 which are for example closed-pore plastic foam plates. The trapezoidal metal plates 105 may for example consist of two or more metal plates between which a plastic layer of for example sound absorbing copolymer is provided (sandwich form). The insulating plates 106 are secured by adhesive to the plates 104 and to composite shells 107.

The trapezoidal corrugation peaks 105b are in contact in strip manner with the plates 104 and 107 via the intermediate insulating plates 106.

By embossed or substantially pointed spacers fitted onto the corrugation peaks 105b contact can only be punctiform at statically predetermined maximum distances. The fitted tips 105b, which may alternatively be inserted in perforations, are preferably of insulating plastic material.

The composite or laminate plate 107 may be an insulating sandwich plate consisting of at least two plates, preferably of metal, with an intermediate layer of for example foamed plastic, for example polyurethane or copolymer. Due to the adhesive force of the polyurethane such sandwich plates have a high shearing strength and together with the tensile and compressive strength a high resistance to bending which can be additionally increased by in particular perpendicular profilings of the sheet metal walls. On both sides of said composite plate 107 further support means may be provided, for example more widely corrugated composite trapezoidal plates 109 and the latter are followed outwardly with interposition of insulating plates 108, for example of plastic foam, by outer shells 114, 115 whose surfaces facing the trapezoidal plates 109 are preferably perpendicularly profiled at 115b. Said outer shells 114, 115 are pressed by anchoring screws 116 and 117 towards each other and against the trapezoidal plates and the perpendicularly supporting tubes disposed in the interior. In this manner forces are produced in the trapezoidal metal plates which effect a stretching upwardly and downwardly and an increased lateral pressure of the horizontally corrugated trapezoidal plates 109 by flattening their corrugations. The construction unit is thus given in the perpendicular and horizontal direction a stress which increases its bending resistance. The support tubes 101 are supported in insulating manner via the plates 104. The composite plates 107 disposed in the interior are angled in U-shaped manner at their edge portions outwardly and seal the inner core of the construction unit in air and vapour-tight manner by means of a resilient seal 135, 135' disposed between said flanges. An anchoring screw 116 in the form of a threaded rod is led in air-tight manner through the U-shaped flanges and the one end thereof has a detachable annular widening provided for example by a ring 116c fitted with a screw. The axial position of the anchoring screw is thus fixed and only rotational movements are possible. The annularly widened foot 116c of the anchoring screw 116 is embedded in the outer shell 114 which may be for example a concreted shell with external plastering 114a in a housing 116d. The opposite shell 115 may also be a loadbearing concrete shell having a plaster layer 115a and receive a detachable screwhead 116a with seal 116b. This screwhead can for the actuation thereof initially project outwardly on an extended anchoring screw portion and when the anchoring screw 116 has brought the nuts 122 and 124 disposed thereon and moveable in opposite directions in predetermined manner into their end position it may be screwed in further. The outwardly projecting screw portion is then cut off. The anchoring screw carries for actuation of the nuts 122 and 124 disposed thereon threads cut into its periphery within certain regions which if necessary have an opposite pitch direction and different pitch height and pitch length. To insert the nuts the diameters of the threaded regions are progressively graduated (not illustrated).

On rotation of the spindles the nuts are pressed against the inside of the U-shaped flanges or an interposed resilient strip 123, the flanges 107a thus being forced to bend the surfaces of their composite plates 107 in inwardly concave arch manner towards each other. The pressure on the trapezoidal metal plates 105 is thus still further increased and transmitted thereby to the support tubes 101. The nuts 124 on the anchoring screw 116 press on rotation of the screw in the direction towards each other against U-shaped bridges 125 which are placed on the screw 116 in the manner shown in FIG. 2 and by which the edge portions of the cover plates 104 and thus the support tubes 101 disposed therebetween are increasingly supported. Holding nuts 122 and 124 are moved simultaneously by the anchoring screw 116 and reach their end predetermined positions simultaneously. In the intermediate spaces between the anchoring screws 116 vertical spindles 127 are also arranged as endless threaded rods with conically widened foot 127a and head nuts 128, consisting of metal or plastic and a sealing strip 129 which is arranged on the head nuts passing therethrough or therearound, preferably with metal strips 129', so that the cavity in which the trapezoidal metal sheets 105 are disposed is sealed in air and vapour-tight manner. These spindles 127 are actuated through slots 141 via perforations (not shown) which are provided from the bottom through the foot plates. The nuts 128 can thus be moved against the angled edge portions 105d of the trapezoidal metal plates 105, thereby pressing said plates together. A further increase in the stress in the horizontal and vertical direction of these supporting means is produced. At the points through which the spindles 117 project a corresponding widening of the slot bore may be provided to permit flattening of the trapezoidal corrugations. The pressure towards the inside against the cover plates 104 and towards the outside against the composite plates 107 is linear via the corrugation peaks.

To reduce sound and heat bridges these contacts may be reduced to the statically permissible amount in that embossings 105b or 109b are formed outwardly at predetermined intervals in the strip-like corrugation peaks. There is then only punctiform contact. Instead of such embossings the trapezoidal peaks may have perforations into which for example semicircle or triangular for example pointed plastic bodies are inserted from the outside and the inside, said bodies preventing the metal contacts. This application of the individual parts may be promoted in that in the overall and individual cavities sealed by seals in air and vapour-tight manner between the plates accommodating the trapeziums correspondingly matched different pressures are produced via tube inlets 130, 131, 132, 133, 134 and if necessary valves (not shown). For example, via tube inlets 132, 133 in the outwardly directed cavities of the trapezoidal plates 107, 109 a reduced pressure or vacuum may be produced but in contrast in the air-tight cavities inwardly sealed in air-tight manner by the same trapezoidal plate an excess pressure may be produced via the openings 130, 131. The construction unit is thus additionally subjected to the atmospheric pressure of 10 t/qm from both sides.

The outer shell 114 comprises a perpendicularly corrugated surface 114b at the inside. Into said corrugated surface 114b a similarly corrugated sheet metal plate 114d may be inserted, for example by adhering, screwing or by grouting the outer surface of said corrugated plate 114d with the material which is to form the outer shell, for example with concrete. The perpendicular corrugation peaks of said plate 114d engage the horizontal corrugation plates of the associated trapezoidal plate 109 associated via an insulating plate 108 only at the points of contact. To reduce these points of contact the already described embossed or attached semicircle or pointed plastic bodies are provided, an insulating intermediate layer always existing between the insulating plate 108 and between the intersecting metal plates. To obtain identical pressure conditions in the vertical corrugation spaces and the horizontally adjoining corrugation spaces of the trapezoidal plates 109 the insulating plates 108 may be provided with perforations 108a.

The spindle 117 carries on both sides of the support tubes 101 opposite threads with nuts 109a and 105a arranged thereon. On rotation of the screwhead 117a said nuts are brought simultaneously into their predetermined end positions. It is possible to choose the pressure such that the composite plates 107 are given for example a slightly concave curviture inwardly. To ensure predetermined spacings nuts 117e provided with opposite threads are arranged with interposed seals 117f to the insides of the shells 114, 115 or the associated insulating plates 108.

The right shell 115 also has at the inside at the top and bottom a perpendicurly corrugated profiling 115b sealed in air-tight manner by surrounding seals 150 and 135'. Preferably, a metal should not be inserted into said corrugation in order to permit the "breathing" of the plate 115 made in particular from porous building material with absorbent gypsum plaster 115a. The moisture which is absorbed by said porous shell 115, 115a may be extracted via the tube sections and valves 133 and the openings 108a in the insulating intermediate plate 108 and replaced by dry air or for example by a previously dry gas which is a poor thermal conductor. The cavities formed in both directions by the horizontal corrugations may be connected by slots 109c. The same pressure then obtains in all the corrugation channels. If the slots 109c are ommited for example a reduced pressure or excess pressure may be established in the corrugation channels sealed in vapour-tight manner individually or as a whole by suitable means (in the direction towards the shell 107) via tube openings 130.

The overall cavity and the individual cavities which exist in the shells 114 and the perpendicular and horizontal corrugation channels and also between the shell 107 and the adjoining corrugation channels are sealed in vapour-tight manner. For this purpose inter alia a vapour-tight insulating plate 135 is provided running round between the outer shell 114 and the sheet 114b and the inner shell 107 at the flanges 107b thereof. The vertically corrugated metal sheets at the inside of the outer shell 114 are for this purpose sealed in air and vapour-tight manner by correspondingly formed resilient seals 114c which close the profiles under pressure. Likewise all the corrugation spaces at the outer shell 115 may be made air and vapour-tight by a corresponding metallic coating for example by means of an aluminium foil, at the vertically corrugated inner surface. The perpendicular spindles 127 move on their rotation the bridges 125 which are threaded in nut-like manner at the passages of the spindle in the downward direction and thus press the spindle 116 with all the construction unit parts arranged thereon also downwardly; correspondingly, at the upper end of the construction unit the pressure is upwardly with the bridges 125 arranged there in similar manner. In this manner the entire construction unit is given a prestressing in the vertical direction which additionally increases its bending resistance.

The combination of all these means makes it possible to provide construction units with prestresses in all directions so that any requirements as regards the bending resistance and compression strength are fulfilled and the desired sound and heat insulation are retained.

At least the inner construction unit between the composite shells 107 is embedded all round in elastically insulating sealing agent 143. Likewise, the shell 115 has an additional resilient rim 135. The supporting bottom parts or ceiling parts, for example of concrete, may on the other hand be covered with a metal plate 146.

To secure the construction unit in a predetermined location, either on a foundation or on and/or at a floor or ceiling, a groove 138 may be formed in the latter into which a U-shaped rail 139 which is connected via screws 140 to the support group 101, 104 may be inserted. The U-shaped rail 139 is preferably encircling and seals the insulating group via a seal 120 in air and vapour-tight manner all round. The cover walls 104 are preferably formed all round at their edge portions with angled portions 104a so that they take up the perpendicular pressure forces with the horizonatal head and foot angled portions whilst the lateral perpendicular angled portions increase their bending and loadbearing capacity.

The shells 114 and 115 may as described be made more loadbearing for example by a perpendicular profiling 114b and 115b of their surfaces which are to be directed inwardly. In such profilings perpendicularly corrugated plates 114d, for example trapezoidal sheet metal plates, may be joined together for example by means of adhesion, screwing or casting round said parts (e.g. concrete with trapezium 114d).

FIG. 2 shows above and beneath the resilient seals 143 metal plates 145 and 146 which are connected together by resilient metal portions 145a substantially in zig-zag form which are embedded over the full width resiliently in the seal 143 to conduct acoustic vibrations which are exerted via the shells 107 or their flange portions 107c, via the metal plates 145 and the resiliently oscillatable zig-zag connecting pieces 145a to the lower metal plate 146 bearing tightly and firmly over a wide area directly for example on a foundation or a floor of concrete. This permits the deflection of the oscillations taken up by the composite plates 107 into the far greater mass of the foundations or floor parts. This takes place without impairing the oscillatability of the shell 107 due to its resilient arrangement on the vapour-tightly encircling resilient seals 143. The structure-borne sound oscillations of the composite plates 107 are made very difficult by interposed sound-absorbing copolymer layers so that the vibrations are dissipated by freely oscillatable plates 145 and the zig-zag metal portions 145a oscillatably connected thereto via the plates 146 connected to the surface of the concrete since the resistance along this path is far less, i.e. a high energy gradient is formed for the oscillations.

The zig-zag resilient connecting piece 145a may be vulcanized in highly elastic rubber.

The acoustic oscillations of these construction unit parts are also conducted to the plates 146 via the U-shaped part 139 and the cover plates 104 firmly and closely bearing thereon as well as the bridges 125. Thus, the outer shell 115 directed towards the inside of the building does not absorb any forced structure-borne oscillations.

Figure 3:
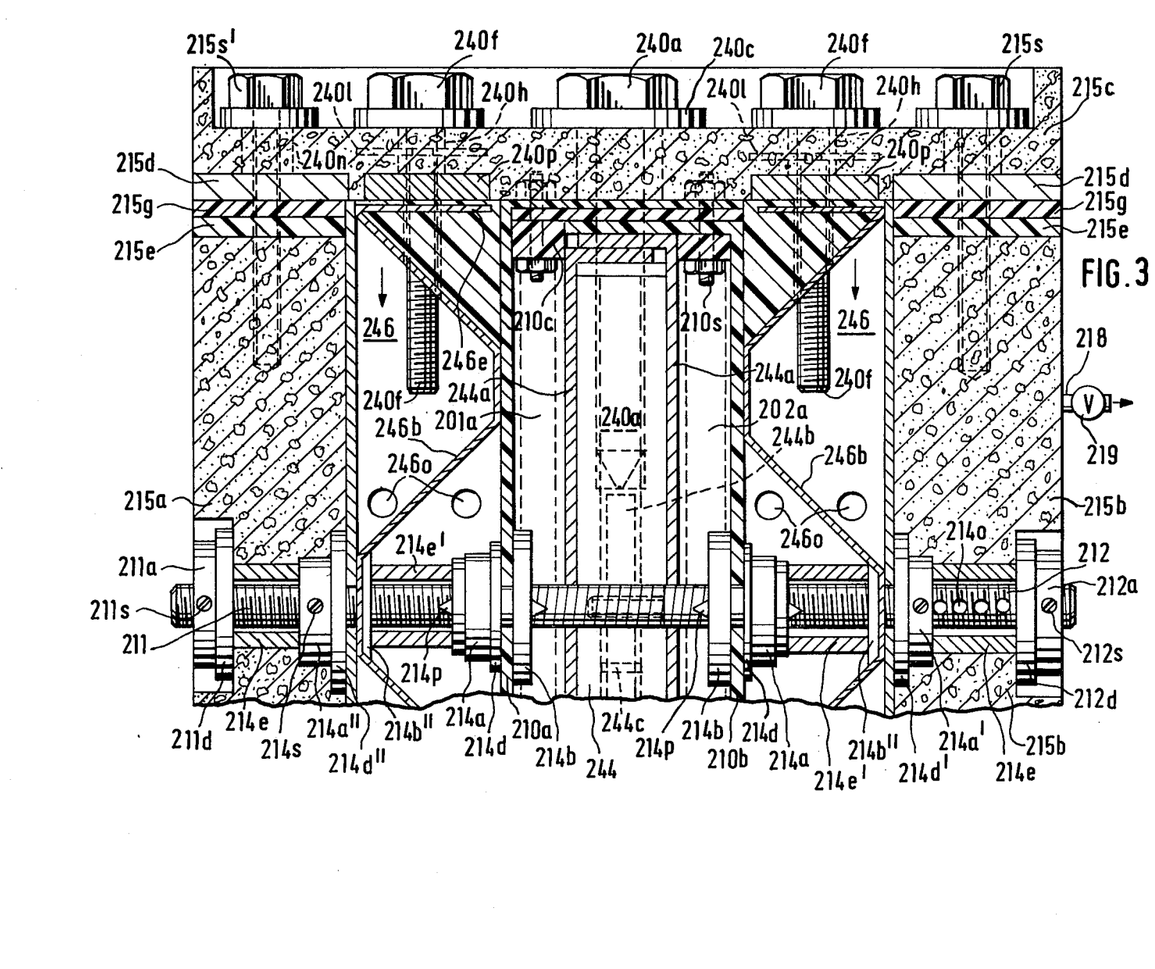
FIG. 3 is a sectional view of a part of a further embodiment of the construction unit.

FIG. 3 shows in vertical cross-section an air and vapour-tightly outwardly sealed composite unit consisting of an outer unit which is formed by two spaced shells 215a, 215b with encircling partly resilient and partly stiff and compression-resistant insulating strips 215d, 215e, 215g, through which screws 215s, 215s' pass which are disposed on a horizontal compression-resistant frame 215c which surrounds the outer construction unit all round. It is thus possible to connect the outer shells 215a, 215b fixedly with this frame and to impart to the shells a high stress in the perpendicular direction via the screws 215s, 215s'. This pressure which is exerted by the screwheads for obtaining the tensile stress is taken up by counter pressure of support elements 201a, 202a of the inner unit which consist for example of perpendicular trapezoidal metal plates which are supported laterally in bendingresistant manner horizontally by corrugated plates 246b with horizontal corrugations. Between the outer shells 215a and 215b and the centre inner wall element 210a, 210b corresponding air-tight cavities 246 are arranged for taking up these horizontally corrugated metal plates, for example trapezoidal metal plates 246b. Through said horizontal corrugations 246b at predetermined intervals anchoring screws 211, 212 project with associated flanges 214a, 214b and seals 214d, preferably through the outwardly directed corrugation peak of the trapeziums with horizontal corrugations 246b. This makes it possible firstly to exert a predetermined application pressure and displacement with respect to each other of the anchoring screws on the corrugations 246b and secondly a predetermined depth of the cavity exactly set and secured in compressionresistant manner. Said corrugated plates are secured by perpendicular screws 240f which are rotatably mounted for example in bushings 240h associated in air-tight manner therewith and project through the outer frame 215c in which a pressure-resistant disc 2401 is provided which engages into an annular groove 240n in the upper threadless cylindrical portion of the screw 240f. The screws 240f are furthermore led via a pressure plate 240p with thread inwardly into the cavity. Following this pressure plate portion it carries a thread which moves the pressure plate 240p against the horizontal end angled portion 246e of the corrugated sheet 246b and presses downwardly. For this purpose the pressure plate 240p comprises a counter thread and presses by actuation of the screw 240f via the horizontal end flange 246e onto the corrugated plate 246b and produces in the latter a stress which acts in supporting manner, partially perpendicularly, partially horizontally, on the adjacent loadbearing support elements. For this purpose the corrugations, in so far as they project through the anchoring screws, are preferably provided with slits to permit if necessary compensation of the displacement of the adjacent corrugations. This makes it possible for the pressure exerted to distribute itself uniformly over the entire trapezoidal metal plate. This stressing can likewise be effected from the lower end. This makes it possible to impart to the horizontally corrugated plates a stress with which on the one hand they effect a high bending-resistant supporting of the adjacent perpendicualr loadbearing support elements 201a, 202a, 244 and on the other hand in the perpendicular direction permits the loadbearing capacity of the frames 215c to be increased. The triangular portion of the trapezoidal metal plate beneath the pressure plate 240p moveable downwardly by the screw may be filled with solid material and for example have an inserted tube section with corresponding thread so that the thread stressing of the pressure plate 240p is also distributed by the screw 240f onto said additional thread.

For further increasing the pressure a reduced pressure or vacuum may be provided.

The presure strips 215e are resilient and take up the stretching of the shells 215a, 215b.

The strips 215g are sliding strips to permit the shells 215a, 215b to move in a direction towards each other under the pressure of the atmosphere and of the entering screws 211, 212. The strips 215d serve for the pressure-resistant distribution of the forces exerted.

In the centre of FIG. 3 as loadbearing support elements perpendicularly corrugated upright trapezoidal metal plates 201a, 202a are provided and between the latter further support elements 244 are provided, for example in the form of a rectangular tube with a cylindrical bore which at both ends comprises threads for receiving a stress screw 240a. Beneath said stress screw in the extension of said thread a cylindrical spindle portion 244b equipped with corresponding counter thread is screwed in and between the lower and upper spindle portion a rod iron is inserted. On this lower portion in which the rod iron is disposed the tube does not have the thread. These spindle portions 244b are screwed towards each other under great force against the disposed rod irons and thus impart to the outer tube 244 a high wall stress. In this connection reference is made to the description of the support elements with regard to FIG. 1.

The inserted rod iron may bear closely on the smooth inner walls of the cylindrical bore of the tube 244. As illustrated in the drawings, it can also leave a free space between itself and the wall and carry at predetermined intervals which are calculated statically rings 244c. The stress screws 240a arranged above and beneath said spindles 244b serve for the stressed arrangement of the inherently prestressed tubes at the upper and lower horizontal plates 215c. The tubes 244 are arranged at intervals (in series seen from the cross-section) and mounted between metal plates 244a. The anchoring screws 211, 212 pass through said intermediate spaces in air-tight manner. They may also serve to support the tubes laterally. To prevent lateral bulging in particular, spacing means, for example horizontally disposed tubes, may be provided. The said elements 201a, 202a, 244 are arranged in a two-part envelope 210a, 210b in air and vapour-tight manner. The latter engage with their right-angles end portions into each other preferably with interposed seals. The metal plates 244a may be provided in identical manner with seals angled displaceable against each other. All the angled portions may be fixedly connected together with screws 210s. The upper and lower ends of the trapezoidal metal plates may be sealed in air and vapour-tight manner by sealing strips. All cavities, chambers and the like are sealed all round in vapour-tight manner and are reflecting or have a reflecting coating. In the cavities, depending on the purpose, reduced pressures, excess pressures or a vacuum are provided. A different pressure may also obtain in the intermediate spaces between the tubes 244.

As FIG. 3 shows, the flanges 214a, 214b are prevented by engaging detent members 214p from changing their location back. If the anchoring heads 212a, 211a are actuated so that they move outwardly by partial turning out of the connecting threads 213, the distance between the two inner flanges 214b and thus the envelopes 210a, 210b is increased. This makes it possible to open individually closed cells, chambers and cavities and to effect an overall evacuation from one point.

The location of the locking screws 214s is effected after the two-part anchoring screw 211, 212 has assumed its end position and the flanges 214a', 214a'' have previously been fixedly tightened against the inner flanges 214b''. Since the anchoring heads 211a and 212a can be detached, the wall shells 215a, 215b can be inserted after assembling the inner wall element and the associated horizontally corrugated trapezoidal metal plates 246b and then firmly pressed against each other by the anchoring screw heads to be tightened.

For the evacuation, evacuating tubes 218, 246o and valves 219 are provided. These are in connection with a joint evacuating means (not shown) so that all the cavities, chambers, cells are evacuatable simultaneously. The support tubes illustrated in FIGS. 1 to 3 were biased with the aid of threaded spindles. Of course, it is possible to replace this pretensioning with the aid of threaded spindles by a high excess pressure inside the support tubes or circular rods inserted concentrically in each other which may be stressed against each other with the aid of external means and then secured together and locked in this stressed state. This may for example be done in that after the stressing against each other of two concentric elements bolts are inserted through bores provided in the concentric elements transversely of the axis thereof so that the stress state is maintained.

It is further possible to provide a larger number of tubes, possibly a circular rod, concentrically to each other and to bias them against each other.

With such support tubes whole frameworks with possibly loadbearing floors can be formed directly or after lining with wall element parts of the type described above with the aid of FIGS. 1 to 3.

Figure 4:
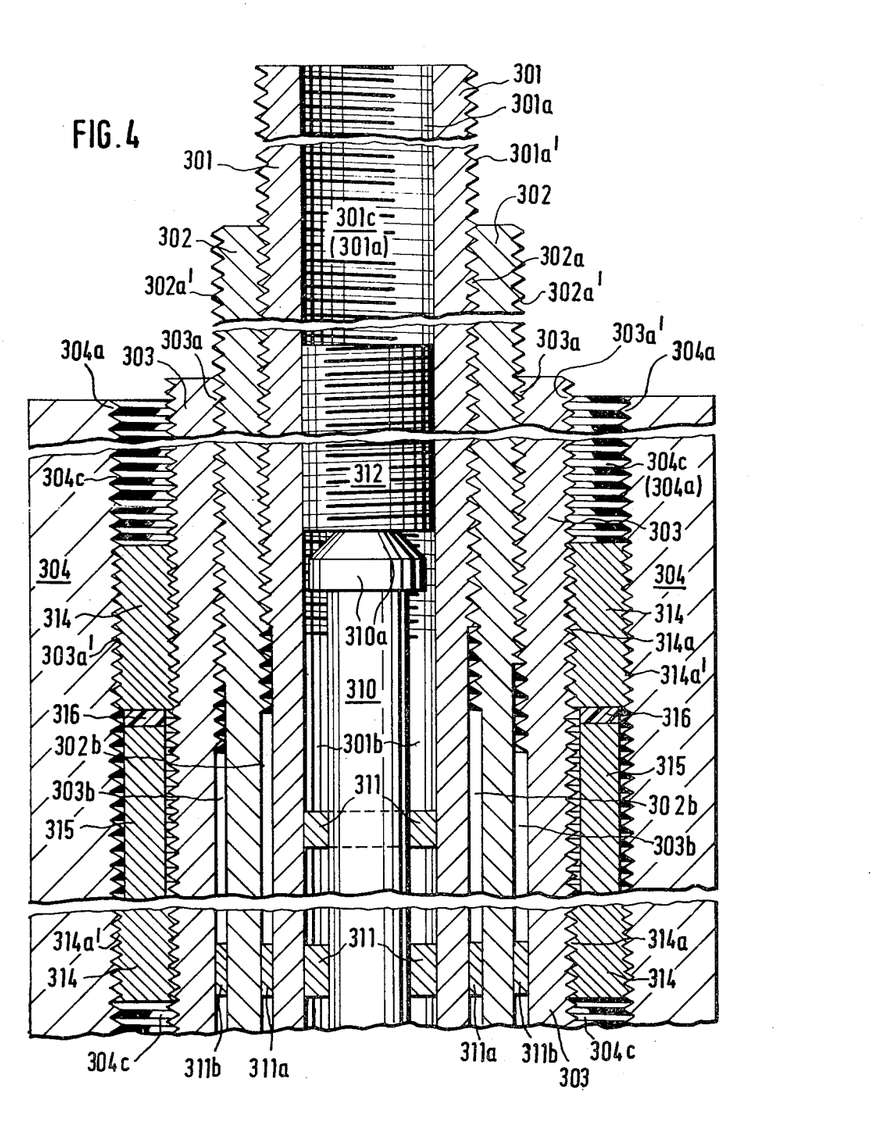
FIG. 4 is a cross-sectional view of one end of an embodiment of a support element consisting of a plurality of tubes which may be used in the examples of embodiment according to FIGS. 1 to 3.

FIG. 4 shows a further embodiment of such prestressed support tubes, said support tube consisting of a plurality of stress tubes inserted concentrically in each other and an inner stress spindle.

The support tube shown in FIG. 4 comprises a one-part tube 301 which at least at its two ends has inner and outer threads 301a and in its cavity receives a spindle 310 with upper and lower threadless spindle heads 310a. Between the spindle 310 and the inner wall of the tube 301 a space 301b is provided and in the annular cavity formed in this manner spacer rings 311 are disposed in statically predetermined intervals. Said rings may be attached in any suitable manner to the spindle 310, for example by providing the cylindrical spindle on its surface at least locally with threads which engage in inner threads in the rings 311. The threadless spindle heads 310a may be screwable onto the spindle 310 which is otherwise cylindrical. Instead of a cylindrical spindle 310 a rectangular tube or rod may be used with likewise corresponding rectangular spacer rings with no thread.

The inner thread 301a of the tube 301 may be set back with respect to the remaining smooth inner surface of the tube 301 at the ends to permit for example the introduction of the spacer rings 311. In the cavity of the tube 301 after introduction of the pressure spindle 310 with the screw head 310a and the spacer rings screws of corresponding thread and diameter may be counter screwed preferably from both sides. In this manner a prestressing of the tube 301 can be achieved by a corresponding pressure load of the spindle 310

The tube 301 is given in this manner a predetermined tensile stress which can be up to the elasticity limit of the tube 301. The stress in the longitudinal direction of the tube acts against any buckling force.

After the screwing in and tightening of the screws 312 the extension pieces (not shown in FIG. 4) are removed so that at both ends of the tube 301 free cavity portions (with or without thread) remain into which other tubes which are for example to be connected to the tube 301 can be screwed or inserted. Such tube portions may also be connected with their portions not serving for the screwing in or insertion to for example other tubes or support elements or the like extending at right-angles to the tube 301. In this manner it is possible by such connections to combine tube or support frameworks with for example rectangular geometrical and three-dimensional form together for example to form structures and structural parts. Such connections may take place in any angular direction.

The tube 301 further comprises at both ends an external thread 301a'. This external thread makes it possible to screw together from both sides half tube members with corresponding inner threads 302a and preferably also with outer threads 301a', substantially comparable to the inner cylindrical facing screws 312. This provides additionally to the stress exerted by the inner screws 312 an additional tensile stress which is produced via the external thread 301a' of the tube 301 and the internal thread 302a of the tube 302 and which acts on the tube 301. Preferably, just as between the spindle 310 and the smooth inner tube wall of the tube 301, between the outer tube wall of the tube 301 and the inner tube wall of the tube 302 by suitable formation of the threads 301a', 302a cavities 302b are formed with spacer rings 311a disposed therebetween at statically predetermined intervals.

In the same manner any desired number of further tubes 303 may be arranged with associated threads 303a, 303a'and spacer rings 311b so that an increased tensile stress acts back onto the tube 301, the inner screws 312 of which can then be correspondingly tightened.

In FIG. 4 rings 314 running round the tube 301 are shown which are screwed in via threads 314a and the outer threads 303a' of the tube 303. The rings 314 may serve various purposes. For example, between them at suitable intervals threadless tubes substantially comparable with the spindle not engaging into the thread 301a of the tube 301 may be provided as pressure-receiving tubes or tube portions between every two rings 314 by which the intermediate tube portion 303b which corresponds to this interval can be provided with a tensile stress.

The rings 314 may be distributed along the tube 303 at corresponding points, and threadless tubes 315 may be provided in each case between two such rings and permit certain portions of the tube 303 to be subjected to a greater tensile stress so that a particularly endangered region of the tube supports can be selectively reinforced.

The tube support illustrated in FIG. 1 is further provided with an outer tube 304 with an inner thread 304a which forms the outer closure of the cylindrical tube support.

This tube 304 may possibly also be tensioned by the rings 314 via interengaging counter threads 304a of the rings 314 and inner threads 304a of the outer tube 304 simultaneously with the tube 303 as described with regard to the latter. For this purpose suitable actuating means may be provided for actuating the rings 314, for example correspondingly locally provided slit-like perforations in the tube 304 and associated engagement perforations in the rings 314.

As apparent from FIG. 4 the ends of the tubes 301, 302, 303 and 304 can be stepped. In this manner, for example, a further tube can be screwed over the inner tube 301 and possible also over the end of the tubes 302 and 303. Furthermore, the outer tube 304 may project more than for example the tube 303 so that extension tubes screwed onto the tubes 301, 302 and 303 are enclosed and supported by said tube 304.

The support tube illustrated in FIG. 4 may be received in other loadbearing elements of different geometrical form, for example in rectangular tubes, and said receiving elements may be formed for example in the interior correspondingly in tubular manner to receive the support tube according to FIG. 4.

The stressing of the individual tubular elements may take place under expedient utilization of the thermal coefficients of expansion of said individual parts.

What is claimed is:

1. A construction unit comprising
   (a) outer shell members defining therebetween a cavity,
   (b) a support core disposed in said cavity and adapted to subject said shells to tensile stress within the planes of said shells, said support core comprising:
      (1) tubular support elements positioned interiorly of said support core and extending parallel to said shells,
      (2) means disposed within and operatively connected to said tubular support elements, said means being adjustable to place said tubular support elements under substantial tensile stress, said stress being transferred to said outer shells through said support core thereby to prestress said shells in the planes thereof.

2. The construction unit of claim 1 further including means to reduce the pressure in said cavity.

3. The construction unit of claim 1 further including means communicating with said cavity for providing therein a pressure in excess of atmospheric.

4. The construction of claim 1 wherein said tubular support elements are rectangular tubes which are formed in the interior as hollow cylinders into which spindles with opposite threads are screwed at the ends from both sides, said spindles on tightening pressing against each other so that the rectangular tube is elastically stretched and put under stress.

5. The construction unit of claim 1 wherein said tubular support elements comprise a series of tubes arranged concentrically with each other, support spindle means inserted into the innermost tube, and means for compressing said support spindle means and thereby placing said tubes under tensile stress with respect to each other.

6. The construction unit of claim 5 wherein the innermost concentric tube is formed at least partially with inner and outer threads, said means for compressing said spindle means being threadedly engaged with said inner threads to compress said spindle means and place under tensile stress said concentric tubes.

7. The construction unit of claims 5 wherein the concentric tubes are stressed by external means and secured in the stressed position by bolts passing transversely through the tubes.

8. The construction unit of claim 1 wherein the free ends of said tubular support elements project out of said shells to permit a connection of one construction unit to further construction units in any desired plane.

9. the construction unit of claim 1 further including prestressed corrugated metal plates preferably with trapezoidal corrugations arranged exteriorly of said support core and which function to increase the bending resistance of the unit.

10. The construction unit of claim 1 further including anchoring screws which extend at least partially through said shells in a transverse direction and which prestress the shells against each other in the direction towards the support core.

11. The construction unit of claim 1 further including honeycomb plate members disposed in the construction unit between said support core and said outer shell members.

12. The construction unit of claim 1 wherein said tubular support elements comprise a series of hollow, rectangular tubes arranged to form a frame, the end portions of at least certain of said tubes being cylindrical and threaded, and spindle means positioned within the tubes in threaded engagement with said threaded cylindrical portions of said tubes, the tightening of said spindles resulting in the tensile stressing of said tubes thereby to provide compression resistance and bending resistance in said tubes in a longitudinal direction, and means interposed between said tubes and said outer shells for transferring such stress to said outer shells thereby to achieve the desired compression and bending resistance therein.

13. The construction unit of claim 12 further including honeycomb plate elements disposed outwardly of said tubes, and means enveloping said honeycomb plates for rendering the same air-tight so as to permit the cavities defined by said honeycomb plates to be evacuated or provided with pressure in excess of atmospheric thereby to provide the desired pressure conditions within the construction unit.

14. The construction unit of claim 13 wherein said means enveloping said honeycomb plates comprises metal plate means disposed said honeycomb plates and said tubes, outer plate means disposed laterally outwardly of said honeycomb plate means and within the adjacent outer shell, and insulating means incirculing said tubes and said honeycomb plate means to provide the desired air-tight cavities for conditioning the air within said unit.

15. The construction unit of claim 14 further including a pair of spaced plastic panels disposed between said last mentioned plate and said adjcacent outer shell, each of said panels being provided with a reflecting layer, with such layers being spaced to define an air cavity, and strip means positioned at spaced intervals in said cavity and penetrating said reflective layers thereby sealing said cavity for conditioning the air therein.

16. The construction unit of claim 14 wherein said plates are formed with bottom end portions which are laterally turned and extend downwardly adjacent each other, and screw means extending through openings in said plate for securing the support core to said outer shells.

17. The construction unit of claim 1 wherein said tubular support elements are formed with cylindrical bores which receive circular rods relatively smaller in diameter than the bore of said tubes, ring means being disposed around said rod for preventing the bending of the same within said tube, and threaded members inserted in the threaded end portions of said tube for subjecting said rods to high pressure thereby providing a correspondingly high tensile stress in said tube.

18. The construction unit of claim 1 further including a composite shell assembly positioned in spaced relation on each side of said support core, and trapezoidal plate means disposed in the cavity between said support core and said composite shell assemblies, any lateral stress in the unit being absorbed by said trapezoidal plates thereby to increase the bending resistance of said unit.

19. The construction unit of claim 18 further including additional trapezoidal plate positioned between said composite shell assemblies and said outer shells for further increasing the bending resistance of said unit.

20. The construction unit of claim 19 further including a plurality of screw members extending transversely between said outer shells and through said trapezoidal plates, said composite shell assemblies and said support core, and means associated with said screw means whereby said screw means can be adjusted to maintain all of said members in their prestressed condition.

21. The construction unit of claim 1 further including a horizontal compressing-resistant frame extending between said outer shells, insulation strip means positioned between said frame and said outer shells, and means for rigidly securing said frame to said shells.

22. The construction unit of claim 21 wherein said tubular support elements comprise a tube having a cylindrical bore, and spindle means threadedly engaging threaded portions of said cylindrical bore, and a stress screw extending through said frame into the threaded cylindrical bore of said tube, the tightening of said spindle means and said stress screw producing high tensile stress in said tube which thereby imparts bending resistance to said unit.

23. The construction unit of claim 22 further including rod members disposed within said tube between said spindle means, said spindle means when tightened applying force to said rod means thereby to provide the tensil stress in said tube.

24. The construction unit of claim 21 further including trapezoidal metal plate members disposed outwardly of said tube, and further metal plate members positioned between said trapezoidal plate members and said tube, and means forming an envelope surrounding said members to provide an air and vapour-tight 25. The construction unit of claim 24 further including second trapezoidal metal plates positioned between said envelope and said outer shells, and means for securing said second trapezoidal metal plates rigidly to said frame, said second trapezoidal plates defining air-tight cavities from or to which air can be evacuated or passed under pressure to provide the desired pressure conditions within said unit.

26. The construction unit of claim 25 further including anchoring screw assemblies extending between said outer shells and through said envelope thereby to maintain said unit in its prestressed condition.

* * * * *